United States Patent [19]
Massie

[11] 3,884,125
[45] May 20, 1975

[54] VARIABLE DISPLACEMENT SEALED PUMP

[76] Inventor: Philip E. Massie, 4220 Irving Pl., Culver City, Calif. 90203

[22] Filed: Nov. 20, 1972

[21] Appl. No.: 308,043

Related U.S. Application Data

[63] Continuation-in-part of Ser. No. 113,321, Feb. 8, 1971, Pat. No. 3,754,154.

[52] U.S. Cl. ................. 92/13.5; 92/13.6; 92/60.5; 417/274; 417/418
[51] Int. Cl. ..................... F01b 31/14; F15b 15/24
[58] Field of Search ................. 92/13.5, 13.6, 60.5; 417/274, 418

[56] References Cited
UNITED STATES PATENTS

| | | | |
|---|---|---|---|
| 1,912,167 | 5/1933 | Anderson | 318/123 X |
| 2,497,105 | 2/1950 | Vords, Jr. | 310/31 X |
| 2,686,280 | 8/1954 | Strong et al. | 318/128 X |
| 2,690,128 | 9/1954 | Basilewsky | 318/122 X |
| 2,768,580 | 10/1956 | Parker | 417/274 X |
| 3,380,387 | 4/1968 | Kofink | 92/60.5 X |
| 3,626,807 | 12/1971 | Shartzer | 92/13.6 X |
| R25,873 | 10/1965 | Rutherford | 92/13.6 X |

FOREIGN PATENTS OR APPLICATIONS

| 725,099 | 3/1955 | United Kingdom | 92/60.5 |
|---|---|---|---|

*Primary Examiner*—Irwin C. Cohen
*Assistant Examiner*—Abraham Hershkovitz
*Attorney, Agent, or Firm*—Herzig & Walsh

[57] ABSTRACT

A completely sealed magnetically driven pump having a piston armature driven by electrical windings. Mechanical variations are provided for variable displacement. A cylinder head is formed by a threaded member which can be adjusted to vary the displacement. The threaded head member may thread into another member which can rotate but is constrained from axial movement.

4 Claims, 12 Drawing Figures

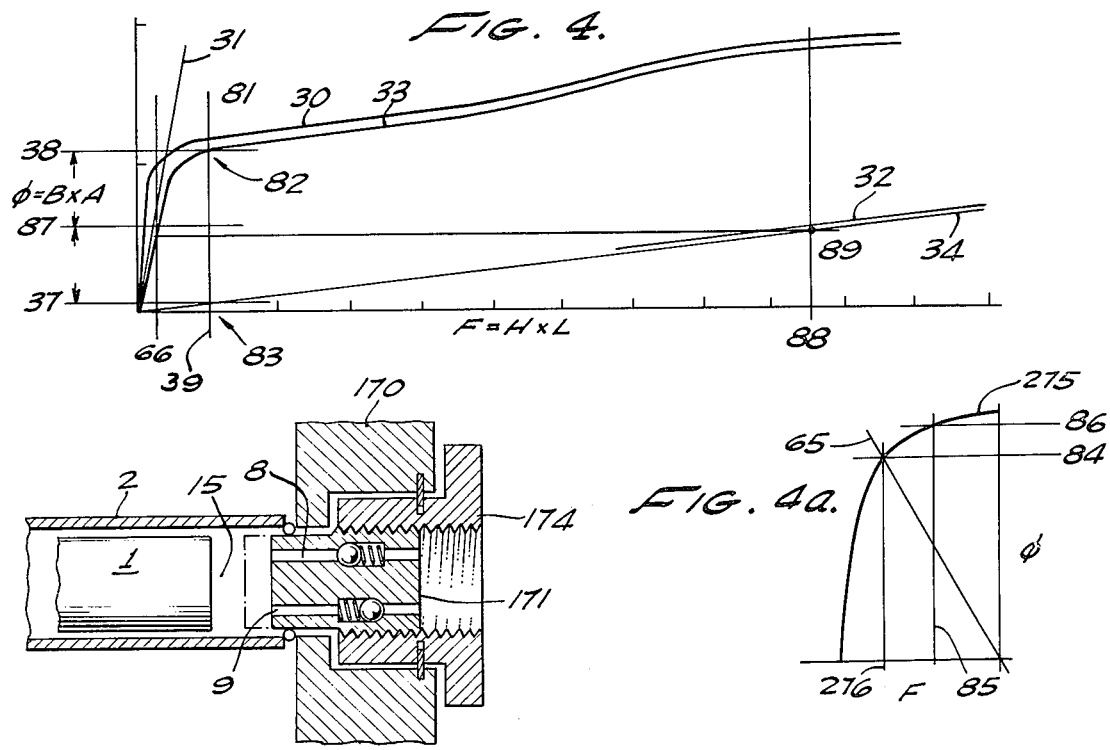
FIG. 4.
FIG. 4a.
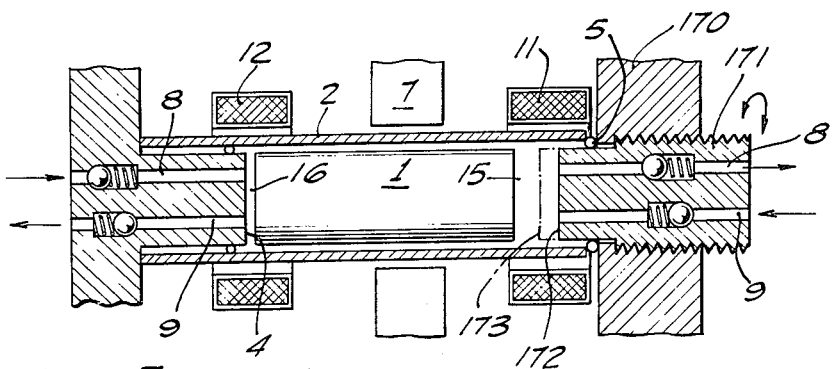
FIG. 8.
FIG. 5.
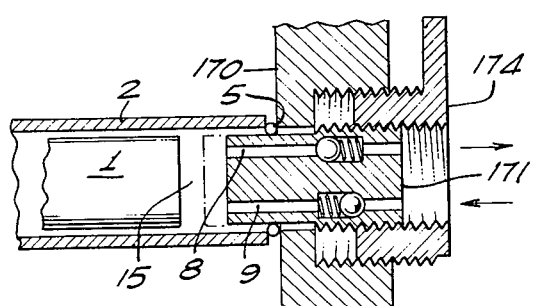
FIG. 6.
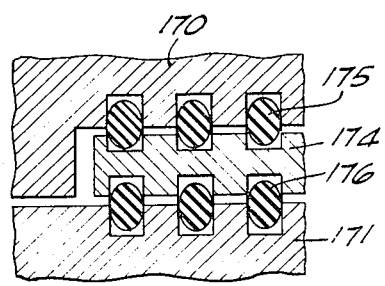
FIG. 7.

VARIABLE DISPLACEMENT SEALED PUMP

This application is a continuation-in-part of U.S. application Ser. No. 113,321 now U.S. Pat. No. 3,754,154 filed on Feb. 8, 1971.

SUMMARY OF THE INVENTION

The need for a sealed pump is emphasized by the many forms of flexible tube roller pumps and vibrating diaphragm pumps on the market. The limitations of crank-driven piston pumps are well known and include: seal problems around rotating shafts, bearings, mass balance problems, belt or coupling means, and the necessity of including a driving motor or some form with the attendant efficiency reduction and maintenance requirements. The three-step conversion of energy in a motor-driven piston pump, electricity to rotating pulley to belt to reciprocating piston, shows the large number of opportunities for energy losses, maintenance requirements, and production cost. Associated with the device is the possibility of escape of noxious, corrosive or lethal materials through the fenestrations of the pump house for shafts and controls.

The flexible tube and roller pump and the diaphragm pump minimize the leakage problem up to the point where the flexible material fails from fatigue or over pressure.

The herein described pump minimizes or eliminates most of these problems; and more specifically, it provides the capability of variable pump displacement in unique ways.

In modifications of the basic form of the pump, constructions are provided by way of an adjustable head, adjustable relative to the pumping cylinder to provide for variable displacement. The realization of this variable displacement capability is a primary object of the invention.

A further object is to realize variable displacement by way of a threaded adjustable cylinder head.

A further object is to make it unnecessary to rotate the threaded head member by threading it into a member which can be rotated to cause the head to move axially.

Another object is to provide a construction as in the foregoing object wherein the second member is threaded into an end member, and the head member is constrained against rotation.

BRIEF DESCRIPTION OF THE DRAWINGS

Further objects and additional advantages of the invention will become apparent from the following detailed description and annexed drawings, wherein:

FIG. 4 is a graph of magnetization curves associated with the pump of FIG. 1;

FIG. 4a is a graph of a demagnetization curve of a permanent magnet;

FIG. 5 is a view of a modified form of the pump having variable displacement;

FIG. 6 is a partial view of another modified form of pump having variable displacement;

FIG. 7 is a view of a preferred sealing arrangement; and

FIG. 8 is a sectional view of another modified form of pump having variable displacement.

DESCRIPTION OF THE PREFERRED EMBODIMENTS

Figure 1:
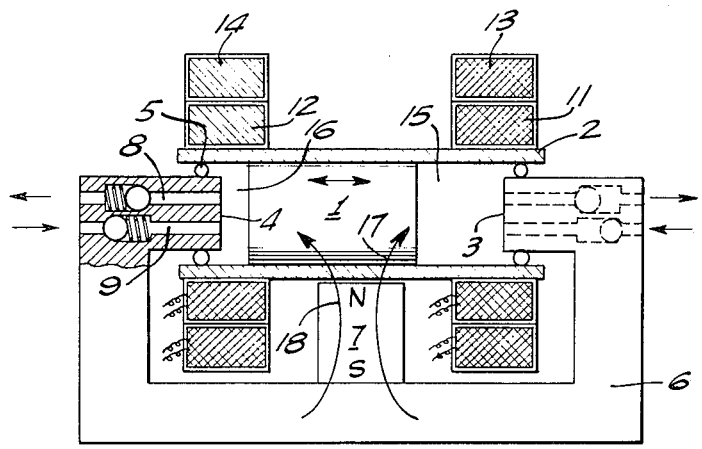
FIG. 1 is a cross sectional view of a basic form of the pump.

The pump in basic form is shown in FIG. 1. The mechanical parts of the pump consist of: a piston/armature 1 of ferro-magnetic material, a cylinder 2 of non-magnetic material, two cylinder head/pole pieces 3 and 4 of ferro-magnetic material, a magnetic core (back iron) material 6 which magnetically connects the two pole pieces, a permanent magnet 7 properly interposed to couple the armature/piston to the magnetic core, and suitable seals between the cylinder and the cylinder head/pole pieces 5. Assembly means may take any desirable configuration, such as tension rods to cross bars on the outside of the pole pieces to pull the assembly together or screw threads between the cylinder and the cylinder head, including tapered pipe threads, screwed together with plumbers pipe dope. The pole pieces and the back iron are not necessarily one part and preferably not for reasons to be explained below. Piston/armature 1 floats in the cylinder.

The electrical portion of the basic pump consists of coils 11 and 12 which drive the pump. These coils are actually wound around the cylinder and preferably cover air gaps 15 and 16 which constitute the pump displacement. Coils 13 and 14 are not power coils, and their function will be explained later.

The cylinder head/pole pieces of the pump contain inlet and outlet ports 8 and 9 to admit and release the pumped material. Suitable valves of any type, i.e., reed, plug, flapper, or ball valves are applicable. The valves are spring loaded, pressure operated in response to pressure differentials across the valves. The valves are of non-magnetic material to minimize sticking due to magnetic forces. (There may be a state of operation where ferro-magnetic valves are desirable, particularly inlet valve 9.)

The pump operates in the following manner. The permanent magnet supplies a magnetic flux to piston/armature 1 through non-magnetic cylinder wall 2. Two paths exist for the magnetic flux through two pole pieces 3 and 4. The magnetic flux divides between two paths 17 and 18. The division of the flux between 17 and 18 is a function of the relative permeance of each circuit. Permeance is that function which relates to the ease with which magnetic flux passes through a circuit under the influence of a given magnetomotive force, $P = \phi/F$. (Units used in magnetic design are strange and wonderful to behold. There are three different systems of units, two of which are in common use in the United States. An explanation of these two is in order here.

A. Mixed English units are based on the inch system.
 1. Flux is expressed in lines per square inch or maxwells
 2. Magnetomotive force is expressed in ampere-turns per inch.
 3. The permeability of a vacuum is 3.192 in this system.

B. C.G.S. units are metric based.
 1. Flux is expressed in gausses.
 2. Magnetomotive force is expressed in oersteds.

3. The permeability of a vacuum is 1 in this system. The ratio between the two systems is conversion from inches to centimeters, with exceptions. Mixed English units will be used herein.)

FIG. 4 shows the magnetization curve. The ordinate is flux in lines (maxwells) for the particular circuit. Kilolines is the generally used term because of the large numerical values. The abscissa is magnetomotive force in ampere-turns. The magnetization curve for a specific magnetic circuit is developed in parts. One half the ferro-magnetic material (one side of the pump) is represented by curve 30 showing the high permeability of the ferro-magnetic material up to the knee of the curve, called saturation. The magnetization curve of an air gap is a straight line. The slope of the line is proportional to the area divided by the length of the air gap. Line 31 represents a short air gap (closed gap) such as 16 in FIG. 1, with a relatively high permeance. Line 32 represents a long air gap (open gap) such as 15 in FIG. 1 with a relatively low permeance. The total magnetization curve for the two sides of the pump is represented by line 33 for the closed gap plus the iron and line 34 for the open gap plus the iron. These curves are developed by summing the magneto-motive force for a given flux quantity.

Line 39 represent the external magnetomotive force of the permanent magnet under a specific condition. FIG. 4a shows the internal demagnetization curves of a permanent magnet of a specific size. The permeance of the total external magnetic circuit is represented by line 65. The intersection of this line with demagnetization curve 275 defines MMF 276 and flux 84; the permanent magnet will develop in the external circuit. MMF 276 of FIG. 4a is the inverse of MMF 39 of FIG. 4. Flux 38 in the closed gap circuit is found at intersection 82 of lines 9 and 33 (FIG. 4). Flux 37 in the open air gap circuit is found at intersection 83 of lines 39 and 34 of FIG. 4. The sum of the two fluxes 37 and 38 of FIG. 4 is equal to flux 84 in FIG. 4a. It can be seen that there is a large difference between the flux in the closed air gap circuit 18 of FIG. 1 and open air gap circuit 17. The mechanical force in pounds in an air gap is equal to $\phi^2/72A$, where $\phi$ is in kilolines and A is the effective gap in square inches, allowing for air gap fringing which increases the area. The net force on the piston is the difference between the two force values. Thus, it is apparent that a large differential force exists to hold the piston in the closed gap position, since most of the flux flows in that gap. No external power is required to hold the piston in this position. This covers the static or starting position of the pump.

With respect to the operation of the pump, if a voltage is applied to coil 11 in such a direction as to aid (increase) the flux in the open gap, flux will be diverted to that gap 15 of FIG. 1. This will tend to pass more flux through the permanent magnet and reduce the magnetomotive force of the magnet along line 275 of FIG. 4a. Thus flux of the permanent magnet moves from line 84 to line 86 as the magnetomotive force moves from line 276 to line 85. The effect of the decrease in permanent magnet MMF is to decrease the flux in air gap 16, curve 33 of FIG. 4. The addition of an electrical MMF is to impress a high MMF on open air gap 15. This produces an increase in flux along line 34 of FIG. 4 while the flux in the closed gap decreases along line 33 of FIG. 4 to a level where the greater amount of flux is in the open air gap. At this point, the balance of force is shifted in accordance with the force equation, and the piston starts to move to close gap 15.

With the constant value of electric MMF, the flux in open gap 15 increases with movement of piston 1. At the same time, the flux in the closed gap decreases. This produces an increasing force to move the piston to close gap 15. As the gap closes, the movement of the piston reduces the volume in gap 15 and displaces any material out through outlet port 8. The pump has completed one pumping stroke. As gap 15 decreases in volume, gap 16 increases in volume, drawing material in for the next pumping stroke.

If power is now removed from coil 11 and applied to coil 12, the same action takes place; and the piston displaces the material drawn into gap 16 and draws more material into gap 15, ready for the next pump stroke. The pump has now completed one cycle, two pumping strokes.

Alternate application of a voltage to coils 11 and 12 will cause the piston to move from one pole piece 3 to the other 4. In the process, the piston alternately increases and decreases the volume of air gaps 15 and 16, thus drawing material in through inlet port 9 and expelling material through outlet port 8, controlled by the logic of normal spring-loaded valves. To establish means of generating the voltage on alternate coils 11 and 12, a 60 hertz constant volume pump may be used. It is possible to design the magnetic and electric circuits to operate on the positive and negative half cycles of a 60 cycle power source. Coils 11 and 12 are connected so that current through the corresponding diodes will generate a flux to aid flux 17 or 18 in the corresponding coil. This is a highly limited application. The utility of this type of operation can be extended by using a variable frequency AC power source, such as a transistor inverter for driving the unit.

Figure 3:
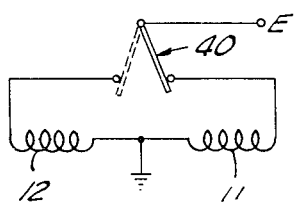
FIG. 3 is a view of a manually actuable switch for controlling the pump.

If single shot manual operation is desired, a manual spring-loaded, single-pole, double-throw switch 40 will suffice, as in FIG. 3. The switch is spring loaded in the center position with neither position connected. The switch is manually pushed from one contact to the other, and the pump will respond with one stroke per switch contact. This might be a desirable method for laboratory test application where precise pressure or air quantities are desired.

Figure 2A:
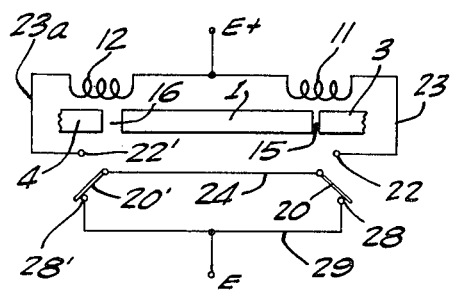
FIG. 2a is a schematic view of the circuitry involved in FIG. 2.
Figure 2:
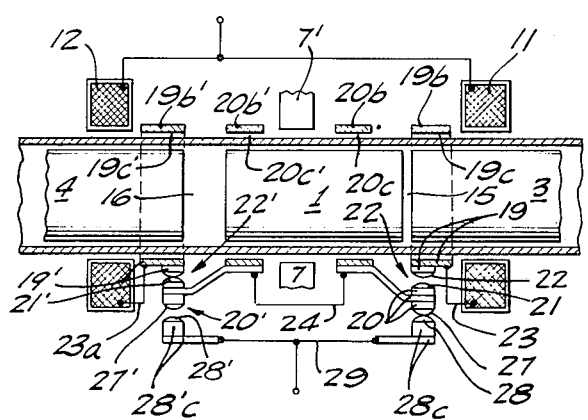
FIG. 2 is a schematic view illustrating magnetic switching control of the windings of the pumps.

A method of automatic lever switch operation is shown in FIG. 2. Spring 20 is a ferro-magnetic and conductive leaf spring carrying back side contact 27 and front side contact 21. A similar spring is installed in relation to air gap 16. Referring to the magnetization curves of FIG. 4, curve 30 is the magnetization curve of the iron only. Curve 32 is the magnetization curve of the open air gap. The two combine into curve 34. At the flux level 37, it can be seen that most of the magnetomotive force is across air gap 16. Now with reed switch 20' close to piston 1 (separated only by the nonmagnetic cylinder 2) as compared to the spacing between armature 1 and pole face 3 (air gap 15) and with a similar magnetic material 19 supporting a contact 22 in close proximity to pole face 3, it is seen that a high MMF will be impressed across magnetic circuit 1, 20', 19', 4. This will produce a corresponding high flux in the air gap between 19' and 20', diverting flux from air gap 16. An equation can be used to design a sufficient force to move reed spring 20', open contacts 27' and 28', and close contacts 21' and 22'. From FIG. 2a, it is seen that this will place power on coil 12 through leads 24 and 29 and contacts 28 and 27, moving the piston to close gap 16. As gap 15 opens, the magnetization curve shifts along line 39 (with deviations) to the intersection with line 34, which is now the curve for gap 15 (the open gap). At this point, contacts 27 and 28 are opened, removing power from lead 23a and coil 12. Contacts 21 and 22 are closed by the large MMF across gap 15. As gap 16 is closed, the MMF moves to the intersection of line 39, the permanent magnet MMF, and line 33, closed gap. Since the MMF across gap 16 is now small and with appreciable air gaps in the reed switch magnetic circuit at the two penetrations of the tube wall 2, reed switch 20' will move and close contacts 27' and 28' and complete the power circuit to lead 23 and coil 11. This will move the piston back to close gap 15, and the cycle will continue.

During the interval that contacts 21, 22 and 21', 22' are both closed with gap 16 closing, the change of flux in coil 12 due to movement of the piston will be such as to produce a current in coil 11 which reduces the flux in gap 15. This will keep the MMF across gap 15 reduced but not low until the piston stops moving, and there is no further change of flux and corresponding induced voltage in coil 12.

Mounting rings 19b, 19b' 20b, and 20b' support the various contacts and increase the area of air gap 19c, 20c between the magnetic portions of the reed switch parts and the pole pieces and the piston/armature. This reduces the reluctance (increases the permeance) of the air gaps and allows more magnetic flux to flow through the reed switch magnetic circuit at any point in the operation. This is typical and not the only method of support of the reed switch contacts. Coils 11, 12, 13, and 14 can be placed at any point on the iron circuit (around the "loop") as long as the coils enclose all the circuit cross section. the preferred location is along some portion of the pole piece/piston region to minimize leakage flux.

Permanent magnet material is hard and difficult to cut or machine. Since cast bars are more efficient than similar material pressed and sintered from powder, it is desirable to use flat-sided magnet sections. This does not adapt well to the round configuration of the center of the pump.

Further, the energy obtainable from a magnet is a function of cross sectional area and length in relation to the external magnetic circuit. The external magnetic circuit has a permeance characteristic of the cross section and the length of the various elements. It is desired to operate the external magnetic circuit at a given flux (flux density times area at the critical point— in this case, working air gaps 15 and 16). The required cross section area of the permanent magnet is selected to provide the desired flux when operated at the optimum point. The length of the magnet is selected to provide the required MMF to force the flux through the external circuit, again operating at the optimum point on curve 275 (FIG. 4a). It is now apparent that the dimensions of the permanent magnet may be entirely independent of all of the other parameters of the magnetic system, i.e., coil cross section, central tube diameter, etc.

Figure 2B:
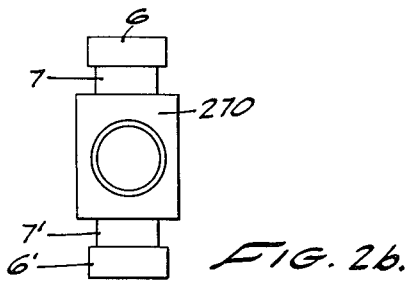
FIGS. 2b and 2c are views of the arrangement of FIG. 2.
Figure 2C:
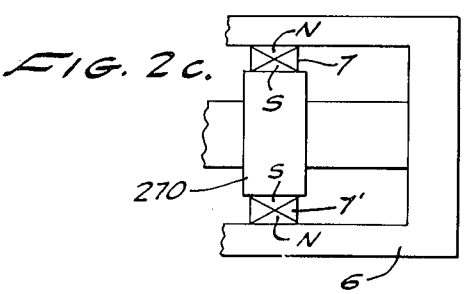

For the above reasons, it is often desirable to provide "coupling" of the permanent magnet to the iron circuit by a shoe 270 as shwon in FIGS. 2b and 2c. The permanent magnet is designated at 7. This is usually a material more adapted to machining operations and much cheaper than permanent magnet material. The designer is now free to design his permanent magnet in any desired configuration. It may be one or more magnets in parallel, as shown in FIG. 2b, or it may be one magnet only. The pump design may be such as to have only one "external leg" and thus, a position for only one permanent magnet. The core is designated at 6 and 6'. The permanent magnet should be close to the "iron" in all cases. The use or omission of a shoe is optional with the design.

VARIABLE DISPLACEMENT PUMP

The requirement for a variable, positive displacement pump is obvious. Such a pump might be used as the fuel throttling device for fuel injection of internal combustion engines. Another use will be in mixing of two or more components in variable ratio. Two pumps can be operated in synchronism from the same source of power with one pump operating at a fixed displacement and the other operating with displacement varied to suit the mix ratio required. A third application is for those fluid or gas moving requirements which require a variable flow rate for any reason, such as variable air supply operation air powered tools at varying rates or where demand will vary with the number of tools used and the utilization rate of the tools. This use stands in comparison to present practice of using constant displacement pumps on an intermittent duty cycle or running continuously and "dumping" excess air.

FIGS. 5, 6, 7, and 8 shown various means of making the pump have a variable displacement by varying the length of the pump stroke.

FIG. 5 shows a pump having one head 4 fixed in position and one head 171 being movable axially into and out of cylinder tube 2. Inlet ports 8 and outlet ports 9 are contained in each head. The movable portion of head 171 is ferromagnetic. It is threaded and screws into a mating threaded portion of the fixed portion of head/pole piece 170. Rotation of moving portion 171 causes it to move from retracted position 172 to extended position 173. Since the displacement of piston 1 is fixed by the length of the stroke, reducing the distance between heads 171 and 4 reduces the stroke length and thus, reduces the piston displacement whether the piston moves left or right. By suitable design of the thread pitch, the relation between rotation of head 171 and the displacement can be made to have any reasonable value.

To establish a specific utilization of this variable displacement pump, the fuel injection system for an internal combustion engine may be considered. Present systems use a pump to draw fluid from the storage system or tank and present it under pressure to a series of valves. The length of time a specific valve is held open determines the amount of fuel injected. Systems exist that have valves assigned one to each cylinder. Other systems have one valve serving multiple numbers of cylinders. The variable displacement version of this pump will have one fuel injection of each stroke of the pump, whether left or right. Thus, this pump version will serve to displace the pump on existing systems and two valves. Each "side" of the pump will serve the function of one valve.

Diesel engines require fuel injection under pressure and at a variable rate. A high pressure version of this pump as described above will serve as the injection means for a diesel engine.

The pump configuration described above requires rotation of head 171 for operation. This implies that the inlet and outlet of moving head 171 be connected to flexible tube means to permit rotation of the head. FIG. 6 shows movable head 171 and fixed portion of pole piece 170 having the same relation as above. A threaded nut 174 is interposed between a portion of moving portion 171 and fixed portion 170 of the head/pole piece. Nut 174 may be single or double threaded. The movable piston is fixed in a non-rotatable position by any suitable means with provision to move axially along the cylinder. The threaded nut is configured in one of several forms so that rotation of threaded nut 174 causes head 171 to move axially. The amount of rotation of threaded nut 174 determines the amount of movement of piston 171 and thus, the stroke and displacement of the pump. The threaded nut may be of ferro-magnetic material or not. FIG. 6 shows nut 174 with a left-hand thread on the inner surface in contact with and mating with a similar left-hand thread on moving piston 171. The nut has a right-hand thread on the outer surface in contact with and mating with a similar right-hand thread on pole piece portion 170. Rotation of the nut causes the movaable portion of head 171 to move with respect to the nut and in the same direction. By this means, the axial movement of movable head 171 is greater than the movement of nut 174. For equal pitch on left-hand and right-hand thread, the head moves twice as far as the nut. The movement of head 171 still changes the displacement of both strokes of the pump since the stroke length is the same in both directions.

Double threaded nut 174 of FIG. 6 may have the threads cut in nut 174, movable pole 171, and fixed pole 170 so the threads mate, i.e., male threads on nut 174 and female threads on movable pole 171 and fixed pole 170. Sealing of a thread of this type against fluid leakage may be significant. FIG. 7 shows a means where a female thread is cut in all parts. A flexible sealing means 175 and 176 is placed so as to tightly fill the combined recesses of the threads. This sealing means has the advantage of a large sealing area, i.e., multiple sealing "rings" in the axial direction and a long and high resistance flow path along the axis of seal 175. Any form of sealing means may be supplemented or replaced by circumferential seals 5. Design of the air gaps between the various elements of the movable head is well known to those skilled in the art.

The threads referred to in FIG. 7 include external and internal threads in nut part 174, internal threads in part 170, and external threads on part 171. As shown, in FIG. 7, the threads comprise adjacent lands and grooves which are helical. Grooves in the nut part 174 come opposite the grooves in parts 170 and 171 as shown so that two helical passageways are formed, one between the outside of part 174 and the inside of part 170 and the other between the inside of part 174 and the outside of part 170. Helical means identified by numerals 175 and 176 is a flexible, elongated member which may be made of rubber, composition or other material suitable for sealing. It will be observed that the threads, that is, the grooves with the sealing member in them forms a joint as well as a seal. In other words, the construction as shown forms a joint between part 170 and part 174 and a joint between part 174 and part 171. In other words, these parts are held from being pulled apart axially. The flexible helical members form a seal as described. As may be observed, the forces tending to pull the parts away from each other axially will cause the square shouldered sides of the grooves to engage with and bite into the flexible helical members and increase the sealing effect.

The sealing means of FIG. 7 can be adapted in any of the arrangements of FIGS. 5, 6, and 8.

The double threaded nut of FIG. 5 may be replaced by a single threaded nut, as shown in FIG. 8. Nut 174 is shown with a thread mating with a similar thread on movable head 171. The thread may take the form shown in FIG. 7 or may be directly mating. Nut 174 is suitably constrained so as not to move axially with respect to fixed pole 170. This may be accomplished by way of splines. Movable pole 171 is constrained against rotation by suitable means. As shown, nut 174 is constrained by a ring, unnumbered, fitting in annular opposed slots in nut 174 and pole 170.

The location of the threads may be reversed with the threads between nut 174 and fixed pole 170. The nut is constrained to move with movable head 171.

Other means may be used to displace movable pole 171 such as a cam, an external drive rod from any source (such as a hydraulic piston) or other mechanical linkage.

The foregoing disclosure is representative of preferred forms of the invention, and it is to be interpreted in an illustrative rather than a limiting sense, the invention to be accorded the full scope of the claims appended hereto.

What is claimed is:

1. A sealed pump comprising: a cylinder having a magnetically actuatable piston therein, the ends of the cylinder being closed and the piston being free from mechanical connections to the exterior of the cylinder; magnetic core means associated with the piston and cylinder; means for magnetically coupling the piston with said magnetic core means, and electrical winding means disposed to produce a magnetic field for reciprocating the piston, said pump having means forming a head in one end of the cylinder, said head means being longitudinally adjustable relative to the cylinder to vary the volume thereof, and means in which the head is mounted, said last means and head having threads comprising helical grooves positioned opposite each other forming a helical channel and means comprising a helical flexible sealing element positioned in the oppositely facing grooves forming the channel.

2. A sealed pump comprising: a cylinder having a magnetically actuatable piston therein, the ends of the cylinder being closed and the piston being free from mechanical connections to the exterior of the cylinder; magnetic core means associated with the piston and cylinder; means for magnetically coupling the piston with said magnetic core means, and electrical winding means disposed to produce a magnetic field for reciprocating the piston, said pump having means forming a head in one end of the cylinder, said head means being longitudinally adjustable relative to the cylinder to vary the volume thereof, said adjustable cylinder head means including a part which is threadably mounted and sealed to the cylinder, whereby upon relative rotation of said threadably mounted part, piston displacement is varied, support means carrying a member which carries said threadably mounted part, said member having external and internal threads, the support means having a bore having internal threads, the threadably mounted part having external threads, all of the threads including grooves, the external grooves on the member and the internal grooves in the bore in the support means facing each other forming a first helical channel and internal grooves in said member and the external grooves on the threadably mounted part facing each other forming a second helical channel and each of said helical channels having therein an elongated flexible sealing element.

3. A sealed pump comprising: a cylinder having a magnetically actuatable piston therein, the ends of the cylinder being closed and the piston being free from mechanical connections to the exterior of the cylinder; magnetic core means associated with the piston and cylinder; means for magnetically coupling the piston with said magnetic core means, and electrical winding means disposed to produce a magnetic field for reciprocating the piston, said pump having means forming a head in one end of the cylinder, said head means being longitudinally adjustable relative to the cylinder to vary the volume thereof, said adjustable cylinder head means including a part which is threadably mounted and sealed to the cylinder, whereby upon relative rotation of said threadably mounted part, piston displacement is varied, support means carrying a member which carries said threadably mounted part, said member having a threaded bore, the threadably mounted part being threaded therein, said support means having a threaded bore and said member having external threads threaded into said bore whereby upon rotation of said member said threadably mounted part can be adjusted axially without rotation, said threadably mounted part having external threads, said bore having internal threads, each of said threads including grooves positioned in facing relationship to each other whereby to form a helical channel and an elongated sealing member fitting in said channel.

4. A sealed pump comprising: a cylinder having a magnetically actuatable piston therein, the ends of the cylinder being closed and the piston being free from mechanical connections to the exterior of the cylinder; magnetic core means associated with the piston and cylinder; means for magnetically coupling the piston with said magnetic core means, and electrical winding means disposed to produce a magnetic field for reciprocating the piston, said pump having means forming a head in one end of the cylinder, said head means being longitudinally adjustable relative to the cylinder to vary the volume thereof, said adjustable cylinder head means including a part which is threadably mounted and sealed to the cylinder, whereby upon relative rotation of said threadably mounted part, piston displacement is varied, support means carrying a member which carries said threadably mounted part, said member having a threaded bore, the threadably mounted part being threaded therein, said support means having a threaded bore and said member having external threads threaded into said bore whereby upon rotation of said member, said threadably mounted part can be adjusted axially without rotation, said member having internal and external threads, said threadably mounted part having external threads, the internal threads in said member and the external grooves on said threadably mounted part comprising grooves having facing relationship forming a first elongated helical channel the external threads on said member and the internal threads in said bore comprising grooves having facing relationship to each other forming a second elongated helical channel and elongated flexible sealing members positioned in said first and second helical channels.

* * * * *